(12) United States Patent
Gattu et al.

(10) Patent No.: US 11,736,442 B2
(45) Date of Patent: Aug. 22, 2023

(54) HANDLING SECURITY EVENTS BASED ON REMEDIATION ACTIONS AND RECOVERY ACTIONS

(71) Applicant: BlackBerry Limited, Waterloo (CA)

(72) Inventors: Balasubrahmanyam Gattu, San Ramon, CA (US); Sreedhar Annamalai, Weston, MA (US); Sean Michael Quinlan, Duvall, WA (US); David Murray Schmidt, Sarnia (CA)

(73) Assignee: BlackBerry Limited, Waterloo (CA)

( * ) Notice: Subject to any disclaimer, the term of this patent is extended or adjusted under 35 U.S.C. 154(b) by 52 days.

(21) Appl. No.: 17/230,617

(22) Filed: Apr. 14, 2021

(65) Prior Publication Data
US 2022/0337554 A1 Oct. 20, 2022

(51) Int. Cl.
*H04L 9/40* (2022.01)
(52) U.S. Cl.
CPC ................................ *H04L 63/0263* (2013.01)
(58) Field of Classification Search
CPC .......................... H04L 63/0263; H04L 63/0281
See application file for complete search history.

(56) References Cited

U.S. PATENT DOCUMENTS

| | | | |
|---|---|---|---|
| 10,740,164 B1* | 8/2020 | Roy | G06F 9/547 |
| 10,834,124 B2 | 11/2020 | Teddy et al. | |
| 10,868,819 B2 | 12/2020 | Zhang et al. | |
| 2006/0010497 A1* | 1/2006 | O'Brien | G06Q 10/10 726/26 |
| 2009/0172461 A1* | 7/2009 | Bobak | G06F 11/0709 714/2 |
| 2020/0089869 A1* | 3/2020 | Richardson | H04W 12/128 |

OTHER PUBLICATIONS

PCT International Search Report and Written Opinion in International Appln. No. PCT/CA2022/050565, dated Jul. 13, 2022, 8 pages.

* cited by examiner

*Primary Examiner* — Amie C. Lin
(74) *Attorney, Agent, or Firm* — Fish & Richardson P.C.

(57) ABSTRACT

Systems, methods, and software can be used to handle security events of a device based on remediation actions and recovery actions. In some aspects, a method comprises: receiving, by a security gateway, a security event notification associated with a device; determining, by the security gateway and based on the security event notification, a risk level of the device; determining, by the security gateway and based on the risk level, a set of remediation actions and recovery actions; and sending, by the security gateway, an action plan indicating the set of remediation actions and recovery actions.

6 Claims, 3 Drawing Sheets

HANDLING SECURITY EVENTS BASED ON REMEDIATION ACTIONS AND RECOVERY ACTIONS

TECHNICAL FIELD

The present disclosure relates to handling security events of a device based on remediation actions and recovery actions.

BACKGROUND

In some cases, electronic devices, including mobile devices or other computer systems, can be exposed to various security risks. Remediation actions can be applied to the electronic devices to address the security risks.

DESCRIPTION OF DRAWINGS

Like reference numbers and designations in the various drawings indicate like elements.

DETAILED DESCRIPTION

In some cases, when a device, e.g., a mobile device or other computing device, reports a malicious activity, event, or log, a remediation action can be applied to the device or a user of the device. For example, a remediation action can be assigning the device to a restricted functionality security group. However, when the malicious activity, event, or log is resolved, existing solutions cannot automatically restore the device to a previous state prior to applying the remediation action. For example, the user of the device may need to wait for an administrator to manually remove the device from the restricted functionality security group, when the remediation action no longer applies, so that the device can resume normal operations. As a result, the efficiency of recovering the device from the remediation action is low with existing solutions. User's operations of the device can be unnecessarily interrupted due to the delay in recovering the device.

Figure 1:
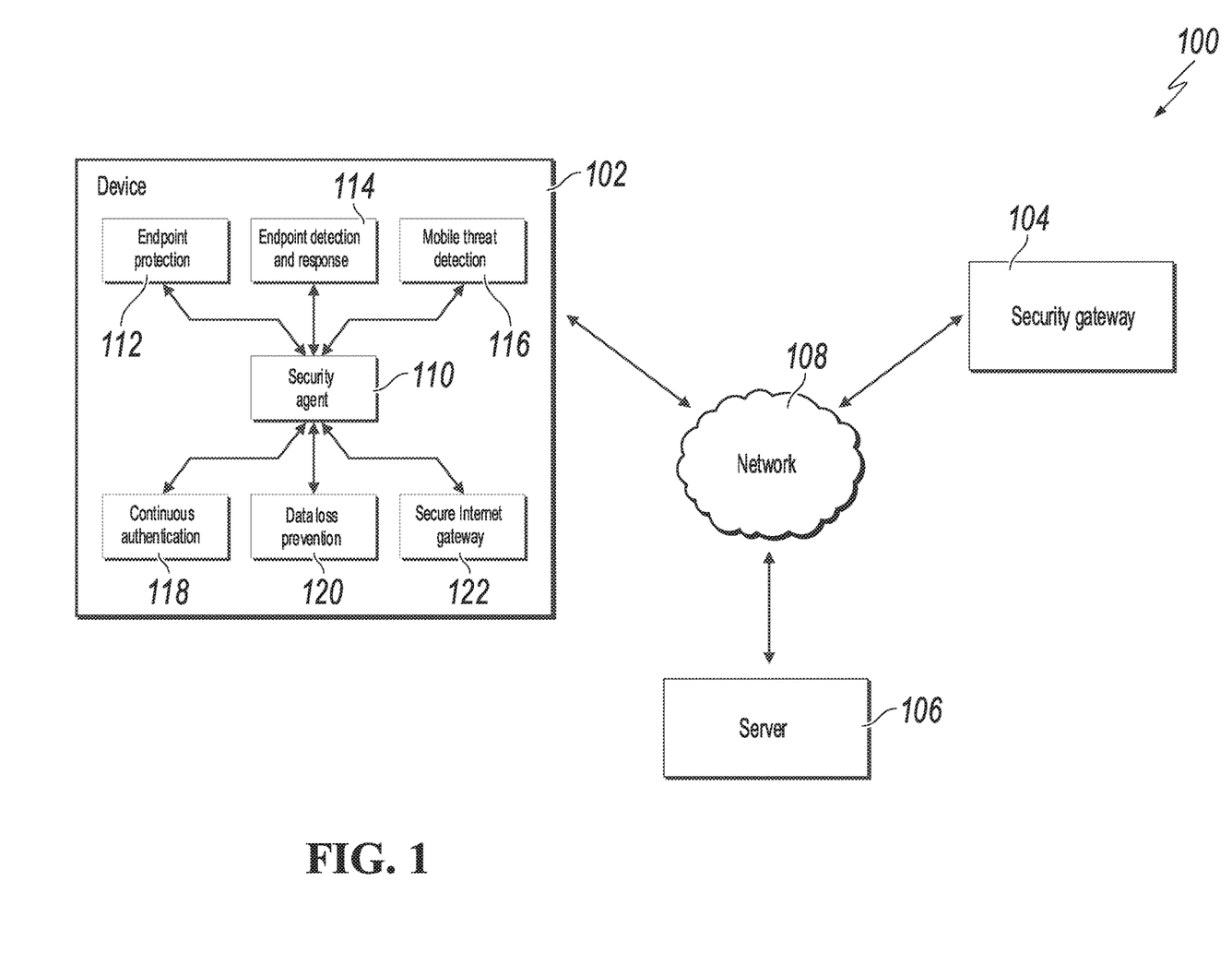
FIG. 1 is a schematic diagram showing an example communication system that provides data communications for handling security events of a device, according to an implementation.
Figure 2:
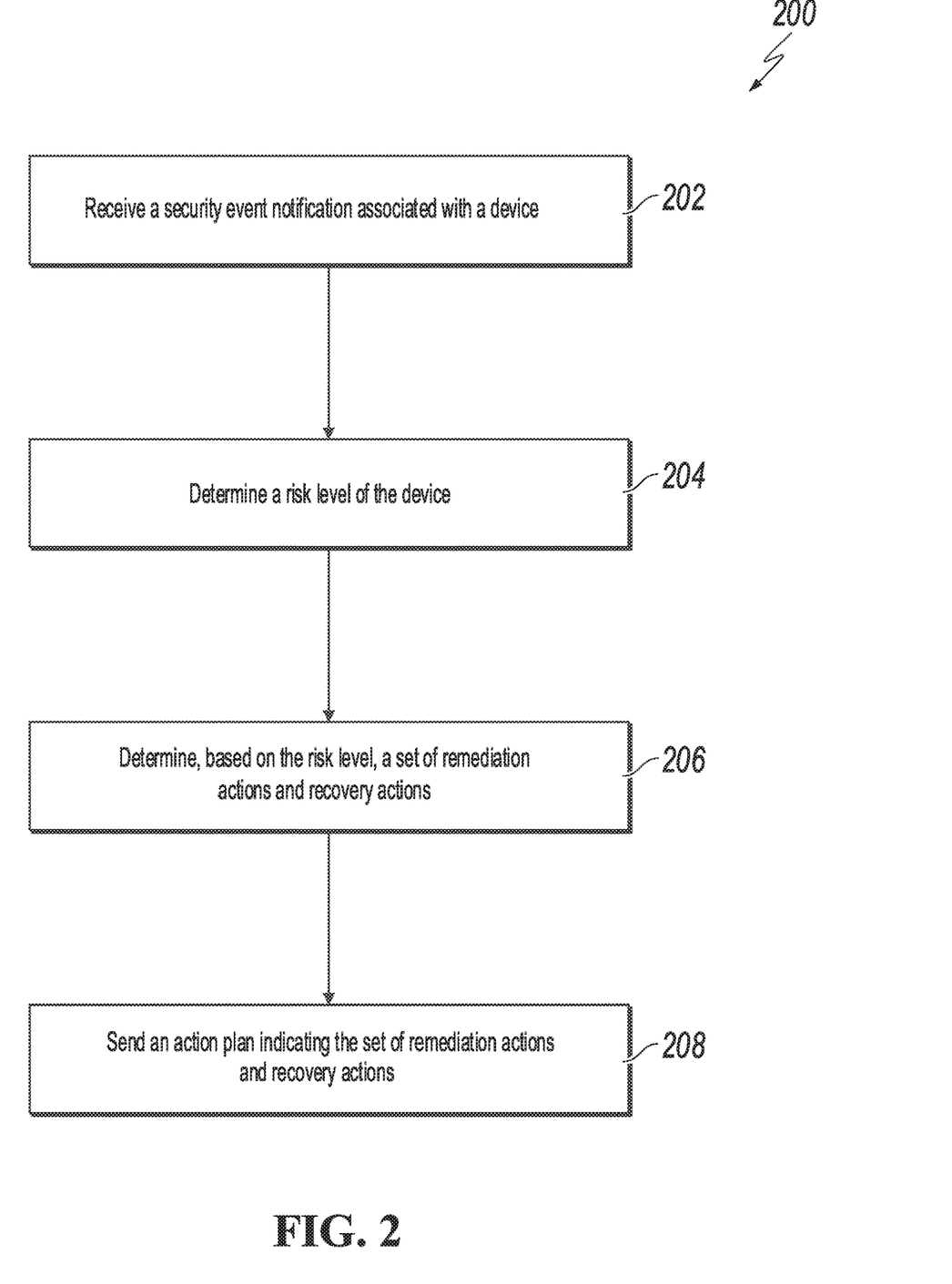
FIG. 2 is a flowchart showing an example method for handling security events of a device based on remediation actions and recovery actions, according to an implementation.
Figure 3:
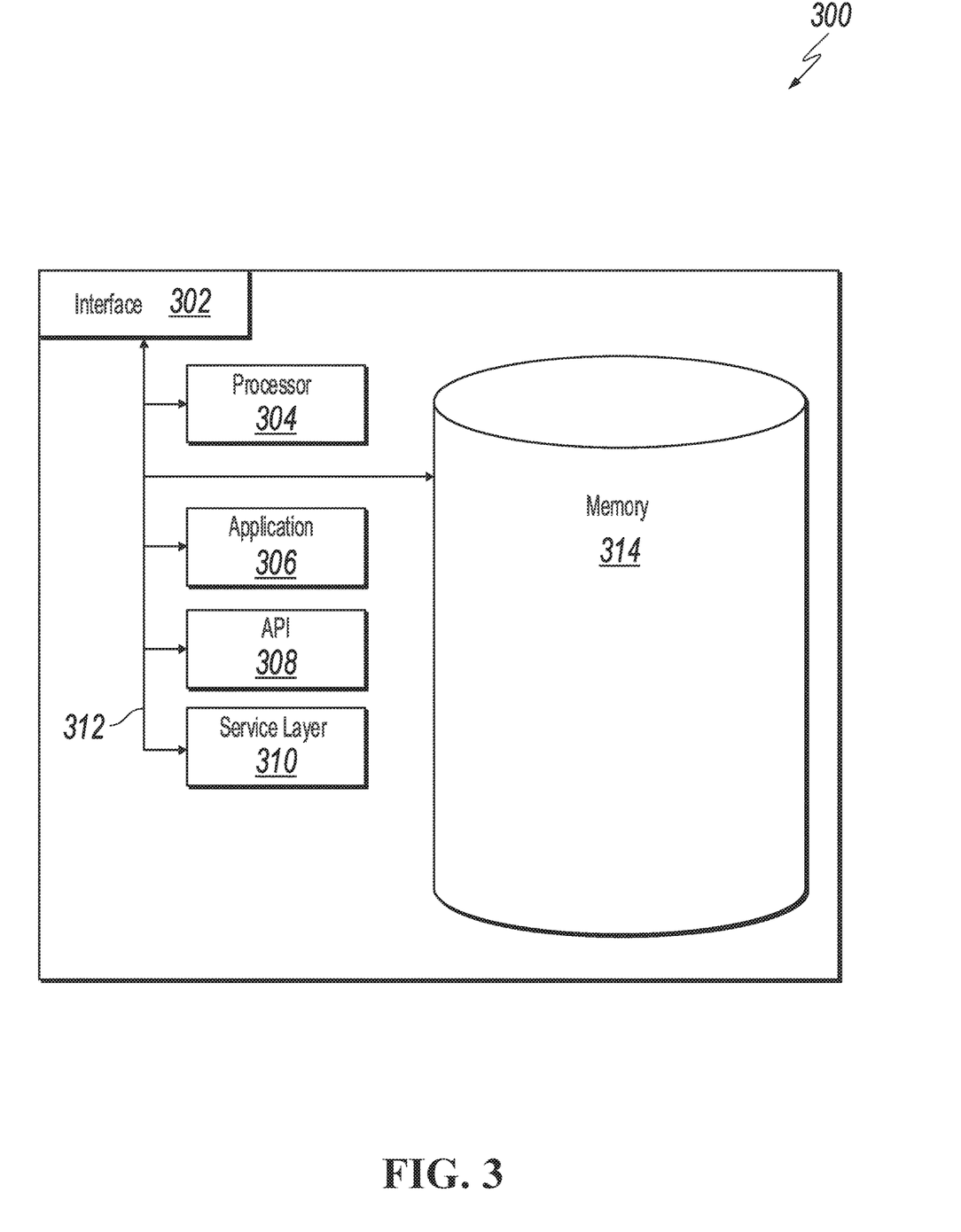
FIG. 3 is a high-level architecture block diagram of a server according to an implementation.

In some implementations, a security gateway can determine a risk level of a device and determine, based on the risk level, one or more remediation actions to be applied to the device. The security gateway can also automatically determine, based on the one or more remediation actions to be applied to the device, one or more recovery actions that can undo one or more prior remediation actions that were previously applied to the device. The security gateway can then send out an action plan including the one or more remediation actions and the one or more recovery actions which can then be applied to the device. FIGS. 1-3 and associated descriptions provide additional details of these implementations.

Techniques described herein produce one or more technical effects. In some cases, efficiency of recovering a device from the remediation action is improved. For example, instead of having an administrator manually remove the device from the restricted functionality security group, the security gateway can automatically determine and send a recovery action that removes the device from the restricted functionality security group. Thus, the speed for recovering the device is faster than in existing solutions. In some implementations, the described techniques can improve the efficiency of determining remediation actions and save computer memory usage. For example, the described technique can avoid configuring one or more remediation actions corresponding to each possible security event, which would require storing a large quantity of correspondences between security events and remediation actions and require high computer memory usage, in particular when the number of possible security events is high. Instead, the described techniques can configure one or more remediation actions corresponding to each possible risk level, where the number of possible risk levels can be significantly lower than the number of possible security events. As a result, fewer correspondences than the existing solutions need to be stored and the computer memory usage can be reduced.

FIG. 1 is a schematic diagram showing an example communication system 100 that provides data communications for handling security events of a device, according to an implementation. At a high level, the example communication system 100 includes a device 102 that is communicatively coupled with a security gateway 104 and a server 106 over a network 108.

The device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

As illustrated, the device 102 can include one or more security functions of endpoint protection 112, endpoint detection and response 114, mobile threat detection 116, continuous authentication 118, data loss prevention 120, and secure Internet gateway 122. The endpoint protection 112, endpoint detection and response 114, mobile threat detection 116, continuous authentication 118, data loss prevention 120, and secure Internet gateway 122 can be an application, a set of applications, software, software modules, hardware, or any combination thereof that is executed on the device 102 to perform the corresponding security function. The mobile threat detection 116 can, for example, detect the applications installed on the device 102, detect whether the device 102 has been rooted, detect whether the device 102 is connected to a secure network, etc. In some cases, a rooted device refers to a device that has been jailbroken to install unapproved applications, update operating systems, delete unwanted applications, underclock or overclock processors, replace firmware, or customize anything else. The continuous authentication 118 can, for example, determine whether the user operating the device 102 is an authenticated user. The data loss prevention 120 can, for example, monitor the documents accessed by the device 102, determine whether the accessed documents are protected documents or unprotected documents, etc. The secure Internet gateway 122 can, for example, monitor the websites and the contents accessed by the device 102, determine the security levels of the accessed websites and the contents, etc.

In some cases, the device 102 can include a security agent 110 that can receive security events from the one or more security functions of 112-122 and send notifications of security events to the server 106. In some cases, the security agent 110 can be an application, a set of applications, software, software modules, hardware, or any combination thereof that is executed on the device 102 to perform the function discussed previously. Alternatively, the security agent 110 may not be implemented on device 102. For example, the security agent 110 can be included on a server, a cloud, or other computing device different from the device 102, and can communicate with an application included on the device 102 to receive the security events.

The security gateway 104 can be included on a server, a cloud, or other computing device. The security gateway 104 can include an action orchestrator and one or more connectors. The action orchestrator can determine remediation actions and recovery actions. The one or more connectors can communicate with an external device, such as the device 102 and the server 106, using a protocol executable by the external device.

The server 106 can be an enterprise mobility management (EMM) server. The EMM server represents an application, a set of applications, software, software modules, hardware, or any combination thereof that can be configured to manage applications and devices for a respective enterprise. The EMM server can install, update, and manage the license of enterprise applications. In some cases, the EMM server can be located on the premises of the enterprise, behind a firewall, or a combination thereof. In some cases, the EMM server can be configured to provision an enterprise service in a cloud. In some implementations, the EMM server can generate security tokens and validate bridge applications for inter-enterprise data communications.

The network 108 represents an application, set of applications, software, software modules, hardware, or combination thereof that can be configured to transmit data messages between the entities in the system 100. The network 108 includes a wireless network, a wireline network, or a combination thereof. For example, the network 108 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within its coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

FIG. 2 is a flowchart showing an example method 200 for handling security events of a device based on remediation actions and recovery actions, according to an implementation. The example method 200 can be implemented by a security gateway, e.g., the security gateway 104 shown in FIG. 1. The example method 200 shown in FIG. 2 can be implemented using additional, fewer, or different operations, which can be performed in the order shown or in a different order.

The method 200 starts at step 202 with receiving a security event notification associated with a device. In some cases, a security agent (e.g., the security agent 110) can receive one or more security events of the device and generate the security event notification indicating the one or more security events. The security events can be, for example, the device is rooted, the device is connected to a compromised network, encryption is disabled on the device, hardware attestation is failed, application integrity attestation is failed, application is sideloaded, device model is unsupported, operating system is unsupported, the device is connected to a secure WiFi, screen lock is disabled, etc.

In some implementations, the security agent can send the security event notification to a security gateway (e.g., the security gateway 104). In some examples, the security agent can send the security event notification to a server (e.g., the server 106) and the server can then send the security event notification to the security gateway.

At step 204, the method 200 determines, based on the security event notification, a risk level of the device. The risk level can include, for example, critical, high risk, medium risk, low risk, etc. In some cases, the risk level can include at least one of an identity risk level or a geozone risk level. The identity risk level can, for example, indicate whether the device is being operated by someone other than the authorized user. The geozone risk level can indicate, for example, that the device is being operated from a suspicious location.

Table 1 shows an example table associated with the identity risk level. Table 1 includes mapping relationships between identity risk levels and risk factors, where the risk factors include security events. In some cases, the method 200 can determine the identity risk level of the device based on the mapping relationships between identity risk levels and risk factors. For example, if the security event notification indicates one or more security events that map to a particular identity risk level, then the method 200 can determine that the device is at the particular identity risk level. For one example, if the security event notification indicates that the device is rooted, the identity risk level can be determined to be critical. For another example, if the security event notification indicates that no security event is detected, the identity risk level can be determined to be low risk.

TABLE 1

| Risk Level | Risk Factors | Assigned Action(s) |
|---|---|---|
| Critical | Rooted | Wipe Device |
|  | Compromised Network | Wipe Applications |
| High Risk | Encryption Disabled | Lock Device |
|  | Hardware Attestation Failed | Lock Applications |
|  | App Integrity Attestation Failed |  |
| Medium Risk | Sideloaded App | Assign device to med_risk_group |
|  | Unsupported Device Model | Reset Device Passcode |
|  | Unsupported OS |  |
|  | Insecure WIFI |  |
|  | Screen Lock Disabled |  |
| Low Risk |  |  |

Table 2 shows an example table associated with the geozone risk level. In some cases, the method 200 can determine the geozone risk level of the device based on mapping relationships between geozone risk levels and risk factors included in Table 2. In some examples, a geozone may be classified, by a predetermined rule or by a machine learning algorithm, as a high risk geozone, a medium risk geozone, or a low risk geozone. The geozone risk level of the device can then be the risk level of the geozone that the device is located in.

TABLE 2

| Risk Level | Risk Factors | Assigned Action(s) |
|---|---|---|
| High Risk | Defined Geozone | Assign device to high_risk_group |
|  | Learned Geozone |  |
| Medium Risk | Defined Geozone | Assign device to med_risk_group |
|  | Learned Geozone |  |
| Low Risk | Defined Geozone |  |
|  | Learned Geozone |  |

In some cases, a risk score can be calculated based on the security event notification and security history of the device, and the risk level can be determined based on the risk score.

In some examples, risk scores can be calculated according to one or more models including behavior location model, defined geozone/geofence model, application anomaly model, networking anomaly model, passive biometrics model, IP address reputation/blacklist/whitelist model, apparent geovelocity model, etc.

In some implementations, the risk score can equate to the minimum current distance from the device to any previously learned geozone. The learned geozones can represent geographical areas assumed to be safe, based on past observations. The system administrator can be provided the option to customize the mapping from this distance to a coarse-grained risk level. For example, if the minimum current distance from the device to any previously learned geozone is less than or equal to 150 yards, the geozone risk level can be determined to be low. If the minimum current distance from the device to any previously learned geozone is less than or equal to 10 miles, the geozone risk level can be determined to be medium. If the minimum current distance from the device to any previously learned geozone is greater than 10 miles, the geozone risk level can be determined to be high.

In some examples, the system administrator can directly assign a geozone a coarse-grained risk level when defining the geozone, along with a risk level to associate with the device being outside of the defined geozone. The risk score can be the maximum of the risk levels associated with each of the defined geozones the device is currently within.

In some cases, a risk score from 0% to 100% can be determined representing a prediction generated by a machine learning model as to whether the currently observed behavior associated with a device does or does not match behavior observed during a training period. In this representation, 0% can be an exact match and 100% can be a severe mismatch. The system administrator can then be provided with the option to customize the mapping of this 0%-100% risk score range to a coarse-grained risk level. For example, a risk score range of 0%-40% can be mapped to low risk level. A risk score range of 40%-80% can be mapped to medium risk level. A risk score range of 80%-100% can be mapped to high risk level.

In some examples, a risk score from 0%-100% can be determined representing a probability that a true anomaly has been detected. The probability can be determined, for example, using a machine learning model based on isolation forest techniques. The system administrator can then be provided with the option to customize the mapping of this 0%-100% risk score range to a coarse-grained risk level.

In some cases, the risk score can indicate whether the device's IP address falls within a trusted set, an untrusted set, neither set, or was not detected at all. The system administrator can then be given the option to customize the mapping of each of these four possibilities to a corresponding coarse-grained risk level.

In some implementations, whenever the security gateway performs a risk assessment for the device, the security gateway can obtain a policy (P) and a set (S) of all possible recovery actions for P from its cache. In some cases, P can include at least one of Table 1 or Table 2. In some cases, the security gateway can use P to calculate the risk level.

In the case of a cache miss (e.g., P or S cannot be found in the cache), the security gateway can obtain P from a policy database. The security gateway can then calculate S by iterating through the risk levels of P and adding a corresponding recovery action to S (excluding duplicates) for each remediation action listed in P. In some cases, the security gateway can maintain mapping relationships between remediation actions and recovery actions, such as Table 3, to determine a corresponding recovery action of a remediation action. In some cases, a remediation action may not have a corresponding recovery action.

An example of calculating S is provided here. Assuming that P includes Table 1 and Table 2, Table 1 and Table 2 altogether include a set of remediation actions (excluding duplicates): Wipe Device, Wipe Applications, Lock Device, Lock Applications, Assign device to med_risk_group, Reset Device Passcode, and Assign device to high_risk_group. For each remediation action of the set of remediation actions, the security gateway can look up Table 3 and add to S a recovery action that maps to the remediation action in Table 3, provided that the remediation action has a corresponding recovery action in Table 3. For example, the remediation action of Wipe Device does not correspond to any recovery action in Table 3, while the remediation action of Lock Device corresponds to the recovery action of Unlock Device. As a result, S can include the recovery actions of Unlock device, Unlock Applications, Remove device from med_risk_group, and Remove device from high_risk_group. In some implementations, the security gateway can update its cache with P and S.

TABLE 3

| Remediation Action | Recovery Action |
|---|---|
| Lock Device | Unlock Device |
| Lock Applications | Unlock Applications |
| Wipe Device | None |
| Wipe Applications | None |
| RebootNow | None |
| Send a message to device | None |
| Reset Device Passcode | None |
| Locate Device | None |
| Assign device to a security group | Remove device from same security group |
| Assign user to a security group | Remove user from same security group |
| Block Network | Unblock Network |
| ... | |

At step 206, the method determines, based on the risk level, a set of remediation actions and recovery actions. In some cases, the security gateway can create an action plan (A) by adding remediation actions according to the assessed risk level. For example, assuming that the identity risk level is high and the geozone risk level is medium, the security gateway can add to the action plan the remediation actions of Lock Device and Lock Applications corresponding to High Risk from Table 1 and the remediation action of Assign device to med_risk_group corresponding to Medium Risk from Table 2.

In some cases, combining two or more sets of remediation actions corresponding to two or more risk levels can result in an action plan that contains conflicting actions. For example, suppose the identity risk level is medium and the geozone risk level is high. Table 1 indicates that the device needs to be assigned to med_risk_group for the medium identity risk level, while Table 2 indicates that the device needs to be assigned to high_risk_group for the high geozone risk level. The two remediation actions can then be conflicting, if the device can not be assigned to the med_risk_group and the high_risk_group at the same time. In some implementations, one or more precedence rules can be used to resolve such conflicts. For example, a precedence rule may specify that identity risk takes precedence over geozone risk. That is, if the result of evaluating a policy, given a pair of geozone and identity risk levels, would be to add two conflicting actions to an action plan, the conflicting action from the geozone section of the policy should not be added to the action plan.

In some cases, the security gateway can prepend to A all the recovery actions from S that do not correspond to a remediation action already present in A. For example, for each recovery action included in S, if the recovery action does not map to, e.g., in Table 3, any remediation action included in A, then the recovery action can be added to A. In some examples, a recovery action that does not map to any remediation action included in A can undo a prior remediation action previously applied to the device.

For example, assuming that S includes the recovery actions of Unlock device, Unlock Applications, Remove device from med_risk_group, and Remove device from high_risk_group, and that A includes the remediation actions of Lock Device, Lock Applications, and Assign device to med_risk_group, the security gateway can determine, e.g., by looking up Table 3, that Unlock device corresponds to Lock Device which is already included in A, that Unlock Applications corresponds to Lock Applications which is already included in A, that Remove device from med_risk_group corresponds to Assign device to med_risk_group which is already included in A, and that Remove device from high_risk_group does not correspond to any remediation action included in A. The security gateway can then add the recovery action of Remove device from high_risk_group to A. As a result, A can include Lock Device, Lock Applications, Assign device to med_risk_group, and Remove device from high_risk_group.

In some cases, the security gateway can persistently store, for each device ID, an array (R) of all possible recovery actions for the effective policy version used in the assessment. In some implementations, different policies can be applied to two different devices, and as a result, the arrays R of the two devices can be different. In some examples, after calculating an action plan for a device ID associated with a device, the security gateway can overwrite any previously stored R corresponding to the device ID with the current value of S. The previously stored R can be the same as or can be different from the current value of S. In some cases, R can include at least one recovery action not included in the current S. For example, a previous S may be calculated in a previous risk assessment and R may be updated to store the recovery actions in the previous S. After that, an administrator may change a remediation action included in the policy. Due to the change of the remediation action, a current S calculated in a current risk assessment may not be the same as the previous S. Therefore, a recovery action included in the previously stored R may not be included in the current S.

In some implementations, the security gateway can prepend to A any recovery action that is included in R but not included in the current S. A may include no remediation action, no recovery action, or any number of remediation actions and any number of recovery actions.

At 208, the security gateway can send an action plan indicating the set of remediation actions and recovery actions. A can be broadcast to any number of servers, devices, services, and/or sent directly to the device that sends the security event notification for execution. In some cases, the effect of a remediation action or a recovery action can be specific to a device. In some cases, the effect of a remediation action or a recovery action can be specific to the device's user. For example, execution of a remediation action or a recovery action can affect multiple devices of the user. In some cases, the device that sends the security event notification (e.g., the device 102) can receive the action plan and execute the action plan. In some cases, the server (e.g., the server 106) can receive the action plan and execute the action plan on one or more devices associated with a user. In some cases, the security gateway can update R with the current value of S.

FIG. 3 illustrates a high level architecture block diagram of a computer 300 according to an implementation. The computer 300 can be implemented as one of the device 102, the security gateway 104, and the server 106 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 300 includes a computing system configured to establish a secured code package for a browser plugin and generate a message communication when executing the plugin in the browser. In some cases, the computer 300 may include a computing system implementing processes and methods disclosed in FIGS. 2 to 6. In some cases, the processing algorithm of the code package establishment can be implemented in an executable computing code, e.g., C/C++ executable codes. In some cases, the computer 300 can include a standalone Linux system that runs batch applications. In some cases, the computer 300 can include mobile or personal computers.

The computer 300 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 300 can serve as a client, network component, a server, a database or other persistency, and/or any other components. In some implementations, one or more components of the computer 300 may be configured to operate within a cloud-computing-based environment.

At a high level, the computer 300 is an electronic computing device operable to receive, transmit, process, store, or manage data. According to some implementations, the computer 300 can also include or be communicably coupled with an application server, e-mail server, web server, caching server, streaming data server, business intelligence (BI) server, and/or other server.

The computer 300 can collect data of network events or mobile application usage events over network 140 from a web browser 130 or a client application, e.g., an installed plugin. In addition, data can be collected by the computer 300 from internal users (e.g., from a command console or by another appropriate access method), external or third parties, other automated applications, as well as any other appropriate entities, individuals, systems, or computers.

Each of the components of the computer 300 can communicate using a system bus 312. In some implementations, any and/or all the components of the computer 300, both hardware and/or software, may interface with each other and/or the interface 302 over the system bus 312 using an application programming interface (API) 308 and/or a service layer 310. The API 308 may include specifications for routines, data structures, and object classes. The API 308 may be either computer language-independent or -dependent and refer to a complete interface, a single function, or even a set of APIs. The service layer 310 provides software services to the computer 300. The functionality of the computer 300 may be accessible for all service consumers using this service layer. Software services, such as those provided by the service layer 310, provide reusable, defined business functionalities through a defined interface. For example, the interface may be software written in JAVA, C++, or other suitable languages providing data in Extensible Markup Language (XML) format or other suitable format. While illustrated as an integrated component of the computers 300, alternative implementations may illustrate the API 308 and/or the service layer 310 as stand-alone components in relation to other components of the computer 300. Moreover, any or all parts of the API 308 and/or the service layer 310 may be implemented as child or sub-modules of another software module, enterprise application, or hardware module without departing from the scope of this disclosure.

The computer 300 includes an interface 302. Although illustrated as a single interface 302 in FIG. 3, two or more interfaces 302 may be used according to particular needs, desires, or particular implementations of the computer 300. The interface 302 is used by the computer 300 for communicating with other systems in a distributed environment connected to a network (whether illustrated or not). Generally, the interface 302 comprises logic encoded in software and/or hardware in a suitable combination and operable to communicate with the network. More specifically, the interface 302 may comprise software supporting one or more communication protocols associated with communications such that the network or interface's hardware is operable to communicate physical signals within and outside of the computer 300.

The computer 300 includes at least one processor 304. Although illustrated as a single processor 304 in FIG. 3, two or more processors may be used according to particular needs, desires, or particular implementations of the computer. Generally, the processor 304 executes instructions and manipulates data to perform the operations of the computer 300. Specifically, the processor 304 executes the functionality required for establishing a described code package disclosed in FIGS. 1 to 6.

The computer 300 also includes a memory 314 that holds data for the computer 300. Although illustrated as a single memory 314 in FIG. 3, two or more memories may be used according to particular needs, desires, or particular implementations of the computer 300. While memory 314 is illustrated as an integral component of the computer 300, in alternative implementations, memory 314 can be external to the computer 300.

The application 306 is an algorithmic software engine providing functionality according to particular needs, desires, or particular implementations of the computer 300, particularly with respect to functionality required for anomaly detection. Although illustrated as a single application 306, the application 306 may be implemented as multiple applications 306 on the computer 300. In addition, although illustrated as integral to the computer 300, in alternative implementations, the application 306 can be external to the computer 300.

There may be any number of computers 300 associated with, or external to, and communicating over a network. Further, this disclosure contemplates that many users may use one computer 300, or that one user may use multiple computers 300.

Described implementations of the subject matter can include one or more features, alone or in combination.

For example, in a first implementation, a method, comprising: receiving, by a security gateway, a security event notification associated with a device; determining, by the security gateway and based on the security event notification, a risk level of the device; determining, by the security gateway and based on the risk level, a set of remediation actions and recovery actions; and sending, by the security gateway, an action plan indicating the set of remediation actions and recovery actions.

The foregoing and other described implementations can each, optionally, include one or more of the following features:

A first feature, combinable with any of the following features, wherein determining the risk level comprises: determining, by the security gateway, a risk score based on the security event notification and security history of the device; and determining, based on the risk score, the risk level.

A second feature, combinable with any of the following features, wherein determining the set of remediation actions and recovery actions comprises: obtaining, by the security gateway, a policy, wherein the policy comprises a first mapping relationship between one or more risk levels and a plurality of remediation actions, and wherein each risk level of the one or more risk levels is associated with one or more corresponding remediation actions; and determining, by the security gateway and based on the first mapping relationship, one or more remediation actions.

A third feature, combinable with any of the following features, comprising: determining, by the security gateway and based on the one or more risk levels, a first set of recovery actions.

A fourth feature, combinable with any of the following features, comprising: determining, by the security gateway and based on the one or more remediation actions, a second set of recovery actions comprised in the first set of recovery actions; and adding, by the security gateway, the one or more remediation actions and the second set of recovery actions to the action plan.

A fifth feature, combinable with any of the following features, wherein determining the second set of recovery actions comprises: obtaining, by the security gateway, a table comprising a second mapping relationship between remediation actions and recovery actions; and determining, by the security gateway and based on the second mapping relationship, the second set of recovery actions by removing one or more particular recovery actions in the first set of recovery actions that map to the one or more remediation actions.

A sixth feature, combinable with any of the following features, comprising: adding, by the security gateway, a third set of recovery actions to the action plan, wherein each recovery action in the third set of recovery actions is not included in the first set of recovery actions.

In a second implementation, a computer-readable medium containing instructions which, when executed, cause a computing device to perform operations comprising: receiving, by a security gateway, a security event notification associated with a device; determining, by the security gateway and based on the security event notification, a risk level of the device; determining, by the security gateway and based on the risk level, a set of remediation actions and recovery actions; and sending, by the security gateway, an action plan indicating the set of remediation actions and recovery actions.

The foregoing and other described implementations can each, optionally, include one or more of the following features:

A first feature, combinable with any of the following features, wherein determining the risk level comprises: determining, by the security gateway, a risk score based on the security event notification and security history of the device; and determining, based on the risk score, the risk level.

A second feature, combinable with any of the following features, wherein determining the set of remediation actions and recovery actions comprises: obtaining, by the security gateway, a policy, wherein the policy comprises a first mapping relationship between one or more risk levels and a plurality of remediation actions, and wherein each risk level of the one or more risk levels is associated with one or more corresponding remediation actions; and determining, by the security gateway and based on the first mapping relationship, one or more remediation actions.

A third feature, combinable with any of the following features, comprising: determining, by the security gateway and based on the one or more risk levels, a first set of recovery actions.

A fourth feature, combinable with any of the following features, comprising: determining, by the security gateway and based on the one or more remediation actions, a second set of recovery actions comprised in the first set of recovery actions; and adding, by the security gateway, the one or more remediation actions and the second set of recovery actions to the action plan.

A fifth feature, combinable with any of the following features, wherein determining the second set of recovery actions comprises: obtaining, by the security gateway, a table comprising a second mapping relationship between remediation actions and recovery actions; and determining, by the security gateway and based on the second mapping relationship, the second set of recovery actions by removing one or more particular recovery actions in the first set of recovery actions that map to the one or more remediation actions.

A sixth feature, combinable with any of the following features, comprising: adding, by the security gateway, a third set of recovery actions to the action plan, wherein each recovery action in the third set of recovery actions is not included in the first set of recovery actions.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, by a security gateway, a security event notification associated with a device; determining, by the security gateway and based on the security event notification, a risk level of the device; determining, by the security gateway and based on the risk level, a set of remediation actions and recovery actions; and sending, by the security gateway, an action plan indicating the set of remediation actions and recovery actions.

The foregoing and other described implementations can each, optionally, include one or more of the following features:

A first feature, combinable with any of the following features, wherein determining the risk level comprises: determining, by the security gateway, a risk score based on the security event notification and security history of the device; and determining, based on the risk score, the risk level.

A second feature, combinable with any of the following features, wherein determining the set of remediation actions and recovery actions comprises: obtaining, by the security gateway, a policy, wherein the policy comprises a first mapping relationship between one or more risk levels and a plurality of remediation actions, and wherein each risk level of the one or more risk levels is associated with one or more corresponding remediation actions; and determining, by the security gateway and based on the first mapping relationship, one or more remediation actions.

A third feature, combinable with any of the following features, comprising: determining, by the security gateway and based on the one or more risk levels, a first set of recovery actions.

A fourth feature, combinable with any of the following features, comprising: determining, by the security gateway and based on the one or more remediation actions, a second set of recovery actions comprised in the first set of recovery actions; and adding, by the security gateway, the one or more remediation actions and the second set of recovery actions to the action plan.

A fifth feature, combinable with any of the following features, wherein determining the second set of recovery actions comprises: obtaining, by the security gateway, a table comprising a second mapping relationship between remediation actions and recovery actions; and determining, by the security gateway and based on the second mapping relationship, the second set of recovery actions by removing one or more particular recovery actions in the first set of recovery actions that map to the one or more remediation actions.

A sixth feature, combinable with any of the following features, comprising: adding, by the security gateway, a third set of recovery actions to the action plan, wherein each recovery action in the third set of recovery actions is not included in the first set of recovery actions.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A method, comprising:
  receiving, by a security gateway, a security event notification associated with a device;
  determining, by the security gateway and based on the security event notification, a risk level of the device;
  determining, by the security gateway and based on the risk level, a set of remediation actions and recovery actions, wherein the determining the set of remediation actions and recovery actions comprises:

determining a plurality of remediation actions corresponding to the risk level based on a first mapping relationship between multiple risk levels and multiple remediation actions;

determining, a plurality of recovery actions based on a second mapping relationship, wherein each of the determined plurality of recovery actions corresponds to at least one of the determined plurality of remediation actions according to the second mapping relationship, and wherein each of the determined plurality of recovery actions recovers the at least one of the determined plurality of remediation actions applied to the device; and generating an action plan, wherein the action plan includes the determined plurality of remediation actions and the determined plurality of recovery actions; and sending, by the security gateway, the action plan including the determined plurality of remediation actions and the determined plurality of recovery actions, wherein the action plan provides a restoration operation of the device based on the determined plurality of recovery actions.

2. The method of claim 1, wherein the determining the risk level comprises:

determining, by the security gateway, a risk score based on the security event notification and security history of the device; and determining, based on the risk score, the risk level.

3. A non-transitory computer-readable medium containing instructions which, when executed, cause a computing device to perform operations comprising:

receiving, by a security gateway, a security event notification associated with a device;

determining, by the security gateway and based on the security event notification, a risk level of the device;

determining, by the security gateway and based on the risk level, a set of remediation actions and recovery actions, wherein the determining the set of remediation actions and recovery actions comprises:

determining a plurality of remediation actions corresponding to the risk level based on a first mapping relationship between multiple risk levels and multiple remediation actions;

determining, a plurality of recovery actions based on a second mapping relationship, wherein each of the determined plurality of recovery actions corresponds to at least one of the determined plurality of remediation actions according to the second mapping relationship, and wherein each of the determined plurality of recovery actions recovers the at least one of the determined plurality of remediation actions applied to the device; and generating an action plan, wherein the action plan includes the determined plurality of remediation actions and the determined plurality of recovery actions; and sending, by the security gateway, the action plan including the determined plurality of remediation actions and the determined plurality of recovery actions, wherein the action plan provides a restoration operation of the device based on the determined plurality of recovery actions.

4. The non-transitory computer-readable medium of claim 3, wherein the determining the risk level comprises:

determining, by the security gateway, a risk score based on the security event notification and security history of the device; and determining, based on the risk score, the risk level.

5. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a security gateway, a security event notification associated with a device;

determining, by the security gateway and based on the security event notification, a risk level of the device;

determining, by the security gateway and based on the risk level, a set of remediation actions and recovery actions, wherein the determining the set of remediation actions and recovery actions comprises:

determining a plurality of remediation actions corresponding to the risk level based on a first mapping relationship between multiple risk levels and multiple remediation actions;

determining, a plurality of recovery actions based on a second mapping relationship, wherein each of the determined plurality of recovery actions corresponds to at least one of the determined plurality of remediation actions according to the second mapping relationship, and wherein each of the determined plurality of recovery actions recovers the at least one of the determined plurality of remediation actions applied to the device; and generating an action plan, wherein the action plan includes the determined plurality of remediation actions and the determined plurality of recovery actions; and sending, by the security gateway, the action plan including the determined plurality of remediation actions and the determined plurality of recovery actions, wherein the action plan provides a restoration operation of the device based on the determined plurality of recovery actions.

6. The computer-implemented system of claim 5, wherein the determining the risk level comprises:

determining, by the security gateway, a risk score based on the security event notification and security history of the device; and determining, based on the risk score, the risk level.

* * * * *